United States Patent [19]

Naoi et al.

[11] 4,384,748
[45] May 24, 1983

[54] OIL FILM BEARING FOR ROLLING ROLL FOR PRODUCING ROLLED SHEETS HAVING A LOW DEVIATION OF SHEET THICKNESS

[75] Inventors: Takayuki Naoi; Keiichi Hamada; Teruyuki Nishide; Makoto Shitomi; Hidetami Noguchi, all of Kurashiki, Japan

[73] Assignee: Kawasaki Steel Corporation, Kobe, Japan

[21] Appl. No.: 181,828

[22] Filed: Aug. 27, 1980

[30] Foreign Application Priority Data

Aug. 31, 1979 [JP] Japan ............................... 54-110180
Aug. 31, 1979 [JP] Japan ............................... 54-110181
Aug. 31, 1979 [JP] Japan ............................... 54-110182

[51] Int. Cl.$^3$ ...................... F16C 33/08; F16C 33/10
[52] U.S. Cl. ...................................... 72/199; 164/442; 384/281
[58] Field of Search ............... 308/15, 20, 37, 78, 308/121, 237 R, 237 A; 72/199, 237, 241, 242; 164/442, 448

[56] References Cited

U.S. PATENT DOCUMENTS 3,627,388 12/1971 Jennings et al. ..................... 308/37
4,093,321  6/1978 Ikariishi et al. ..................... 308/121

FOREIGN PATENT DOCUMENTS 736228  6/1943 Fed. Rep. of Germany ... 308/237 A
 872481  4/1953 Fed. Rep. of Germany ........ 308/78
54-140045 10/1979 Japan ................................... 308/121
 398332  9/1933 United Kingdom .................. 308/37
 440173  2/1975 U.S.S.R. ............................... 72/237

Primary Examiner—Richard R. Stearns
Attorney, Agent, or Firm—Balogh, Osann, Kramer, Dvorak, Genova & Traub

[57] ABSTRACT

Metal sheets having a low deviation of sheet thickness are produced by rolling a sheet through a finishing rolling mill in which at least a final stand is provided with oil film bearings of a rolling roll, each of which consists of a bushing in a roll chock bearing box and a sleeve tightly fitted to a tapered neck of the roll to form a journal relative to the bushing, and is provided with a key connection fixing the sleeve to the rolling roll in a zone of less than 0.2 times the length of a bearing pressure receiving zone from the end of the tapered fitting zone of the sleeve and the roll neck.

9 Claims, 13 Drawing Figures

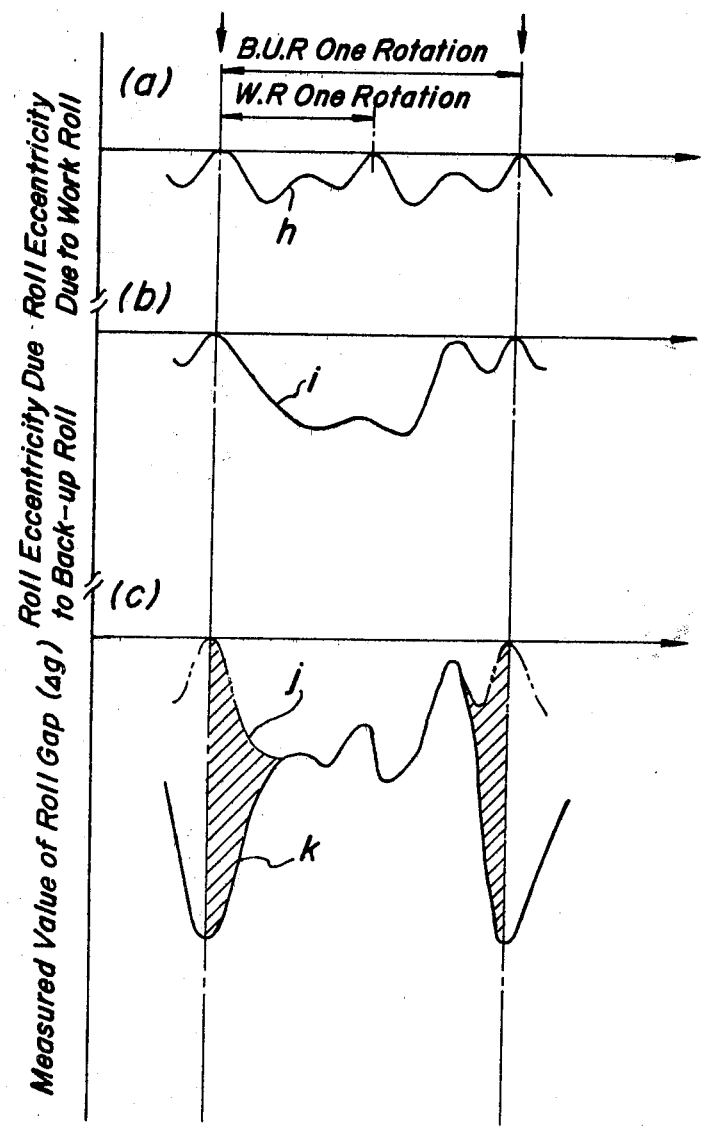
FIG_5

FIG_6a
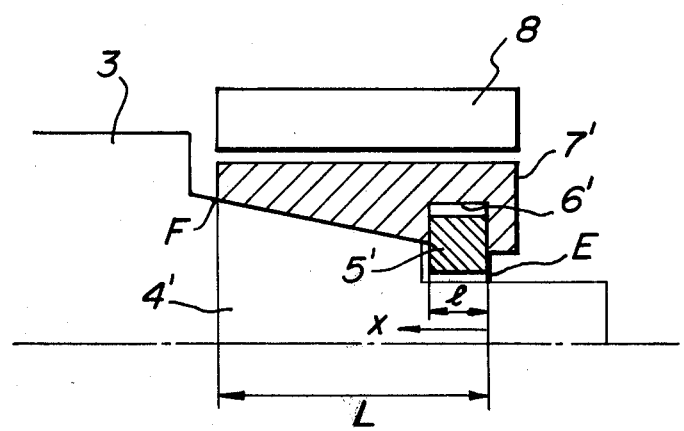
FIG_6b
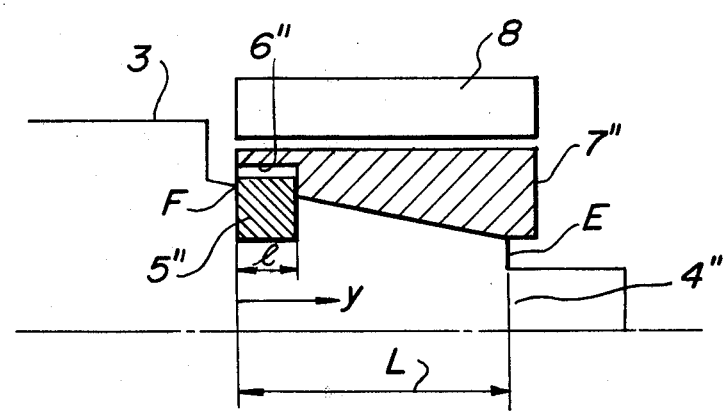

FIG_8

OIL FILM BEARING FOR ROLLING ROLL FOR PRODUCING ROLLED SHEETS HAVING A LOW DEVIATION OF SHEET THICKNESS

The present invention relates to an oil film bearing and a method for rolling metal sheets in which the deviation of sheet thickness is decreased by means of the oil film bearing.

Recently, for a continuous rolling of sheet materials, automatic gauge control (hereinafter abbreviated as "AGC") has been effected (in any case of hot rolling and cold rolling) in an attempt to uniformize the sheet thickness in the longitudinal direction of the rolled sheet.

For better understanding of the invention, reference is taken to the accompanying drawings, wherein:

FIG. 5 is a graph showing the variation of the roll gap due to the roll eccentricity at every rotation of the roll;

Figure 7:
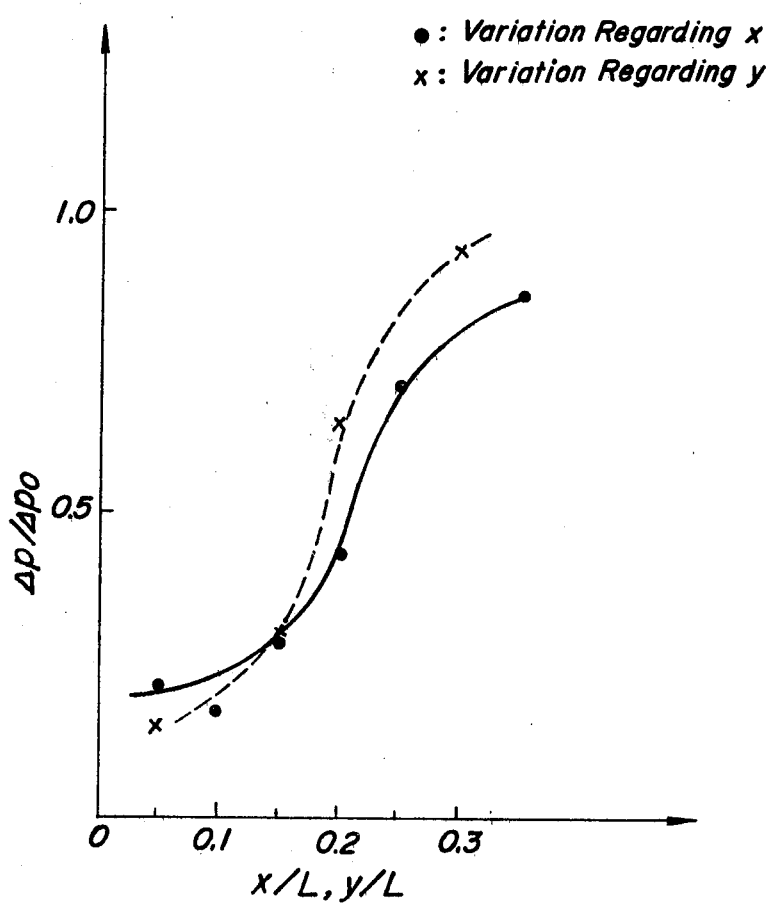
Figure 8:
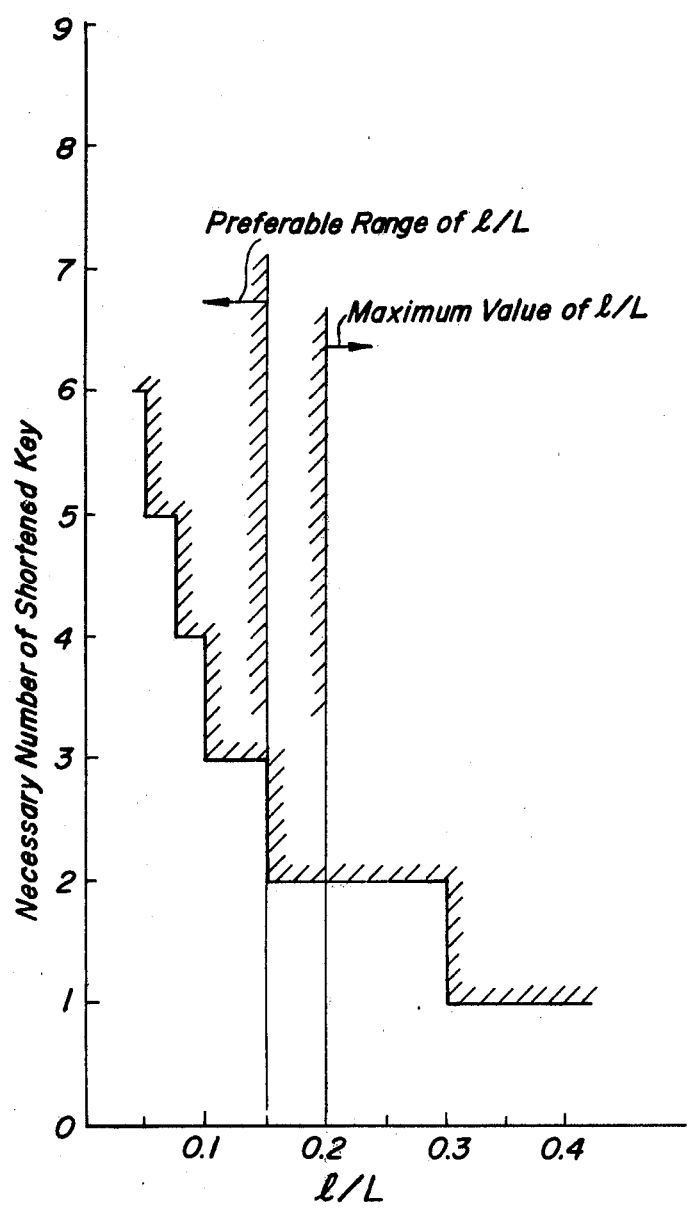
Figure 9:
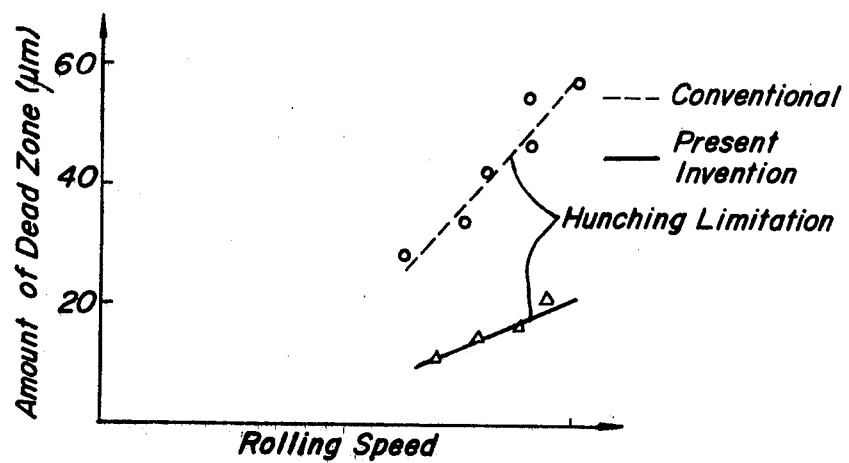
Figure 10:
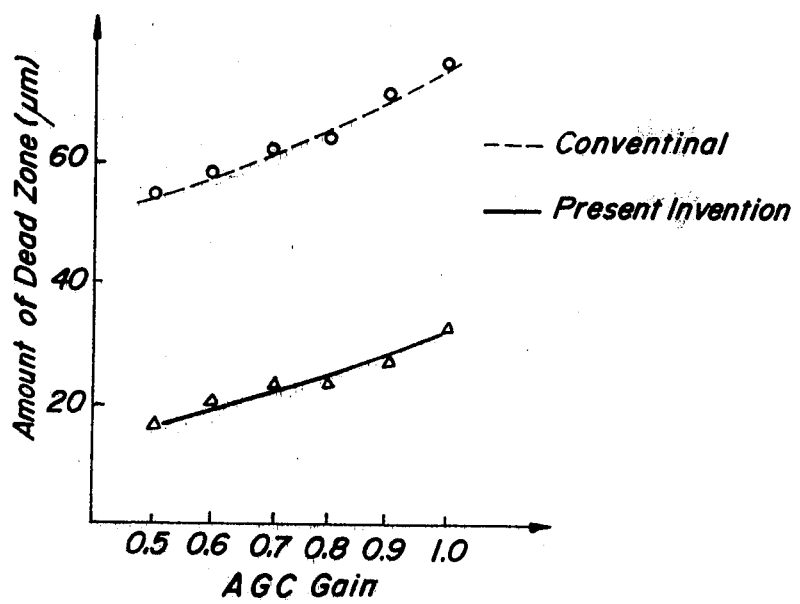
Figure 11:
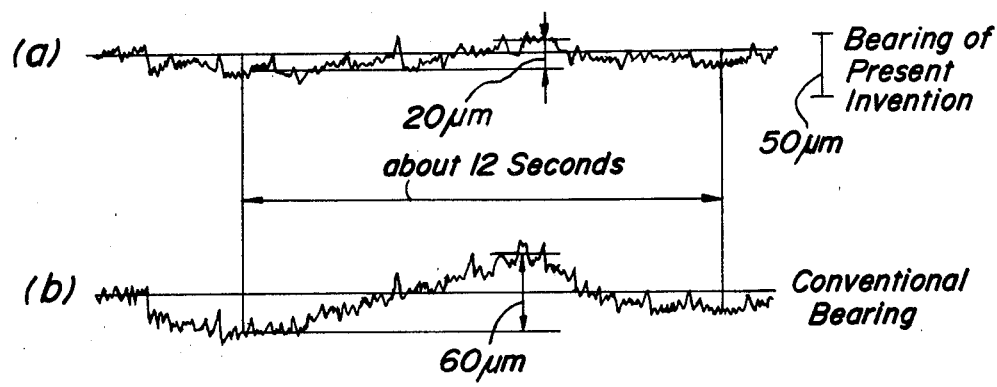
Figure 12:
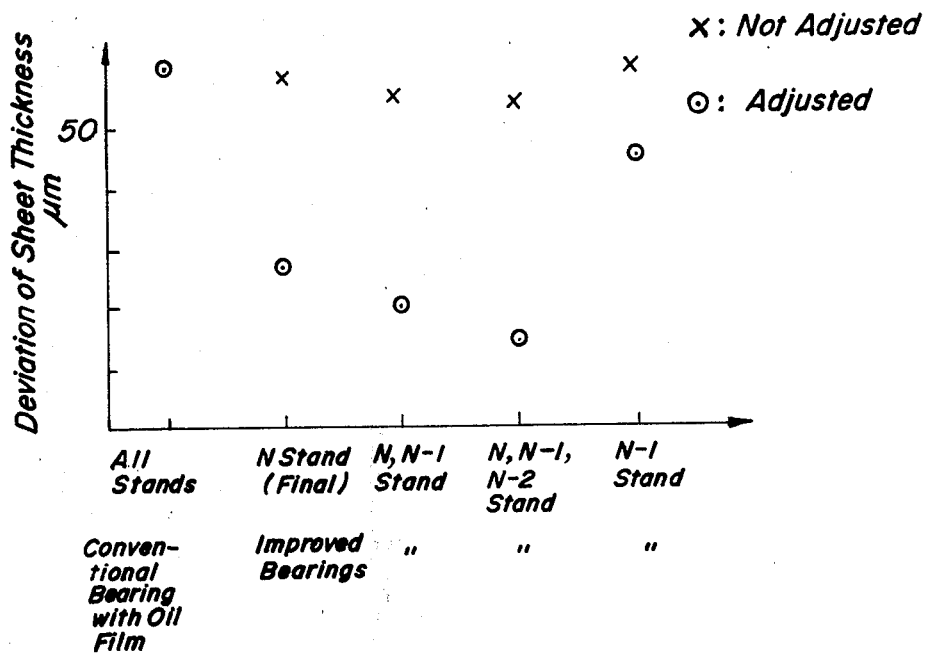

FIG. 6, (a) and (b) are diagrammatical cross-sectional views for showing the states setting the key according to the present invention;

FIG. 7 is a graph showing the relation of the set length of the key to the rolling load fluctuation;

FIG. 8 is a graph showing the relation of the key number necessary for obtaining the given shearing strength to the set length of the key;

FIG. 9 is a graph showing the hunching limitation by the relation of the amount of the dead zone to the rolling speed;

FIG. 10 is a graph showing the hunching limitation at the highest rolling speed by the relation of the amount of dead zone to AGC gain;

FIG. 11, (a) and (b) are graphs showing the deviation of the sheet thickness when the rolling process of the present invention and the conventional rolling process are applied to AGC; and FIG. 12 is a graph showing the relationship of the deviation of the sheet thickness to the number of mill stands having the oil film bearings according to the present invention, when the amount of the dead zone and AGC gain are adjusted and when they are not adjusted.

Figure 1:
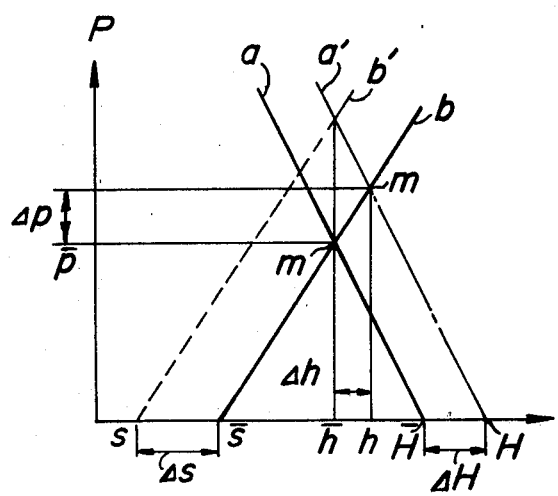
FIG. 1 is a schematic view for explaining the controlling manner of AGC of BISRA system.

AGC in the rolling of sheets is BISRA system in substantially all cases and in this system, the sheet gauge is estimated from the screw position and the rolling load as shown in FIG. 1 and this is compared with the aimed sheet thickness and when deviation is found in the sheet thickness, the screw position is adjusted so that the deviation becomes zero to control the sheet thickness.

When the sheet thickness at entrance side is H and the set gap between work rolls is S in FIG. 1, the plasticity curve of a material and the elasticity curve of a rolling machine are shown by a and b in FIG. 1 respectively and in this case, the sheet thickness h at exit side is shown by a point m of intersection of both the curves a and b.

When AGC is effected for obtaining an aimed sheet thickness of h, if the sheet thickness at the entrance side is varied by $\Delta H$, the rolling load is varied by $\Delta p$ and the sheet thickness at the exit side becomes h and a deviation $\Delta h$ of the sheet thickness relative to h is caused. Thus, a roll gap is varied by $\Delta s$ from S to S so that $\Delta h$ becomes zero.

Thus, in AGC of the BISRA system, the variation of the thickness of the sheet to be rolled is calculated with the variation of the rolling load and the roll gap being adjusted depending upon the degree of the variation required to automatically control the sheet thickness for obtaining the desired value. But in a rolling mill, the variation of the roll gap, which does not appear in a detector and is usually referred to as "roll eccentricity," is large. When variation is caused in the rolling load due to the roll eccentricity, AGC cannot be satisfactorily effected and the quality of the rolled sheet is deteriorated.

Figure 2:
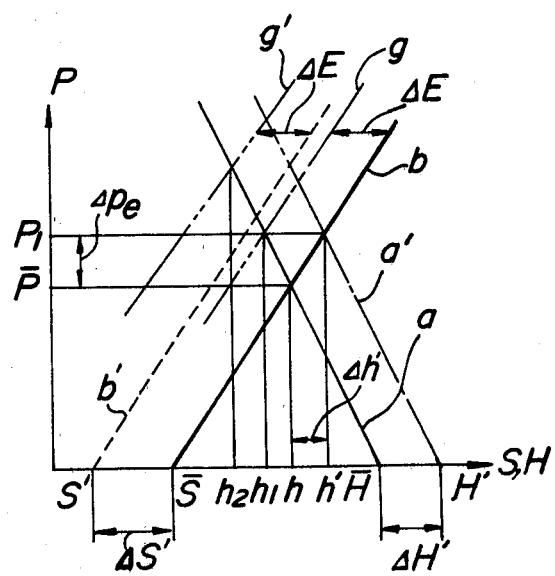
FIG. 2 is a schematic view for explaining the adverse influence of the roll eccentricity upon effecting AGC of BISRA system.

As shown in FIG. 2, if the variation of the roll gap owing to the roll eccentricity is $\Delta E$, the roll gap is shown by a curve g in reality with respect to the apparent elasticity curve b of the rolling mill and therefore, the rolling load is varied by $\Delta Pe$ from p to $P_1$. But S is detected as the roll gap, so that the load variation $\Delta Pe$ caused by the roll eccentricity is in practice measured as one caused by a variation $\Delta H'$ of the sheet thickness at the entrance side in the control apparatus. Therefore, the roll gap is varied by $\Delta S'$ so that $\Delta h'$ becomes zero by assuming the deviation of the sheet thickness at the exit side to be $\Delta h'$. Accordingly, in reality, the sheet thickness $h_1$ at the exit side becomes more thin thickness $h_2$ by AGC. A curve shown by g' in FIG. 2 shows the elasticity curve of the rolling machine which is more varied by the roll eccentricity when the roll gap is varied by $\Delta S'$.

Thus, in AGC of the BISRA system, the roll eccentricity is a great external important cause, which disturbs the control gauge, and causes various difficulties together with the variation of responsibility of the screw down apparatus. Therefore, it is necessary to reduce the roll eccentricity as small as possible.

It has been heretofore considered that the roll eccentricity is due to the working precision of rolling rolls, such as a work roll and back-up roll, but the inventor's later studies (disclosed in Japanese patent laid-open application No. 112,760/76) have found that the major part of the causes are due to the oil film bearings of back-up rolls.

Figure 3:
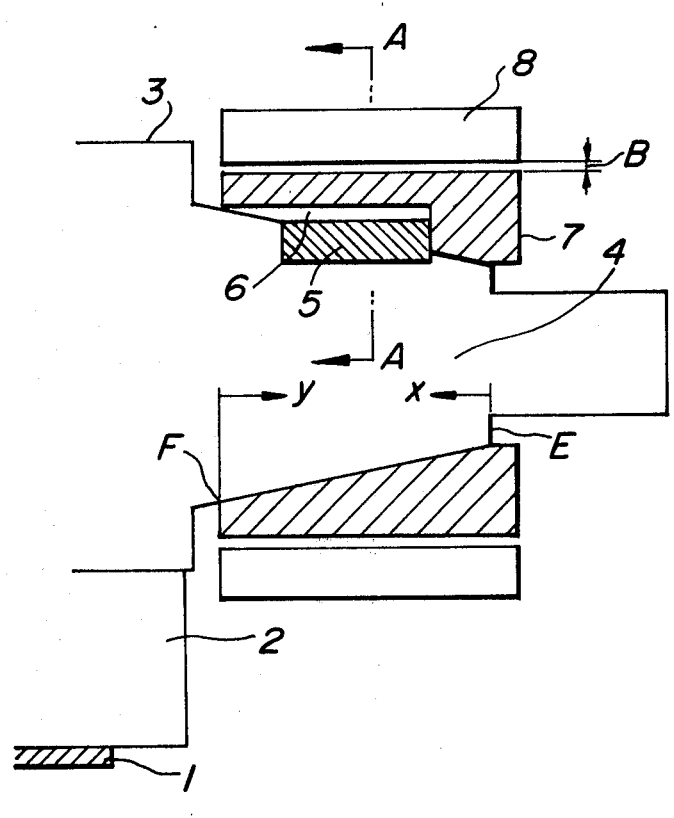
FIG. 3 is a vertical cross-sectional view of a conventional tapered neck oil film bearing.

A typical bearing of the back-up rolls, is a tapered neck bearing and one embodiment is shown in FIG. 3 as a cross-sectional view of the essential part thereof. In FIG. 3, a numeral 1 is a rolling material, a numeral 2 is a work roll, a numeral 3 is a back-up roll, a numeral 4 is a tapered neck of the back-up roll 3, a numeral 5 is a key and a numeral 6 is a keyway. An oil film bearing consists of a bushing 8 and a sleeve 7, which is tightly engaged to the taper neck 4 of the back-up roll 3 to form a journal against the bushing 8.

In order to prevent a rotation of a sleeve 7 relative to a tapered neck 4, a key 5 is provided to form a key connected and the keyway 6 formed in a tapered hole of the sleeve 7 is made to be slightly larger than the height of the key 5 projecting from the taper neck 4, so that a gap is formed between a bottom of the keyway 6 and the key 5.

Figure 4:
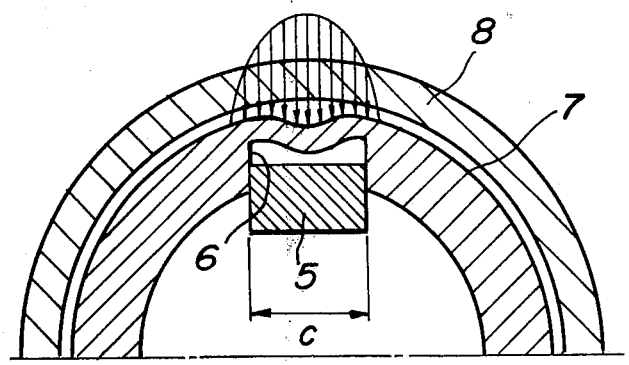
FIG. 4 is a cross-sectional view taken along the line A—A in FIG. 3.

When a rolling is effected by means of a rolling mill provided with a roll journaled with an oil film bearing, the sleeve 7 is subjected to a rolling load by the bushing 8 through an oil film (B part in FIG. 3) and a rolling force of q(θ) as shown in FIG. 4 acts on the sleeve 7 and when the keyway portion (C part in FIG. 4) is aligned with the position of the sleeve 7 subjected to the rolling force, the keyway portion of the sleeve 7 is deformed as shown in FIG. 4 and the roll gap is enlarged by the extent corresponding to the deformation. The above described deformation of the keyway portion is mainly due to the plastic deformation but the elastic deformation is more or less caused.

At every time when the keyway portion rotates to the face subjected to the rolling force (the face subjected to the rolling force q(θ)), the great variation of roll gap, other than the variation of the roll gap relating to the working precision of the rolls 3 and 2, is caused and the rolling load is suddenly reduced owing to this variation.

The variation of the roll gap of every one rotation of the roll is shown in FIG. 5 by comparing each sole case of the work roll and the back-up roll with the combined case with respect to usual four-high rolling mill as a typical embodiment.

(a) and (b) in FIG. 5 are graphs showing the degree of the roll eccentricity due to the working precision of the work roll and the back-up roll respectively and a curve j in a graph (c) shows the synthesis of curves h and i in the graphs (a) and (b). Accordingly, if the cause of the roll eccentricity is due only to the working precision of the roll, the variation of the roll gap of the four-high rolling mill combining these rolls ought to align with the curve j in FIG. 5, (c) but in the actual measurement, the variation is made as shown in a curve k.

The positions shown by the arrow D at the upper portion of FIG. 5 are the states where the keyway portions of both the upper and lower back-up rolls align with the faces subjected to the reduction force.

Namely, a hatched portion in FIG. 5, (c) is the variation of the roll gap caused by the deformation of the keyway portion of the sleeve and this amount may become 70~80% of the total amount of eccentricity.

As mentioned above, in AGC of the BISRA system, the roll eccentricity is a great external cause, which disturbs the control, and when the variation of the rolling load due to the roll eccentricity is supplied to the AGC as it is, the sheet thickness accuracy is rather damaged, so that heretofore, when the AGC of BISRA system is effected, it is necessary to provide a large amount of dead zone so that the AGC is not operated by the variation of the rolling load due to the roll eccentricity and therefore it has not been expected to obtain rolled sheets having a high thickness accuracy. Particularly, in the final stand of the finishing strands of the hot strip mill, the stability of rolling is most important, so that the AGC of BISRA system has not been used yet.

The inventors have made experiments and studies so as to solve the problem of rapid variation of the rolling load due to the keyway and found that the given objects can be advantageously attained by limiting the set position of the key and the keyway and the set length of the key connection determined by the fitting length thereof as follows.

The set position of the key and the keyway is defined from the end of the taper fitting zone of the sleeve and the roll neck and the set length of the key connection is defined to be less than 0.2 times the length of the bearing pressure receiving zone, that is the length of the zone upon which the rolling force applied to the sleeve from the roll chock acts.

The inventors have made the following measurement. Firstly, a sleeve and a tapered neck, which were not provided with keyway, were manufactured and then the key connections were set in gradually larger length along a range x or y from both the ends E and F of the tapered fitting zone respectively as shown in FIG. 6, a and b. Sleeve 7' and tapered neck 4' in FIG. 6a, and sleeve 7" and tapered neck 4" in FIG. 6b, have their key connections (key 5' and keyway 6') at different locations. Now, the roll eccentricity turns out rolling fluctuation, when rolls turn under the light rolling force without a rolled sheet. Accordingly, the rolling force fluctuations in these bearings are measured. For comparison, the similar investigation was carried out with respect to the case where the conventional oil film bearing was used. The obtained results are shown in FIG. 7 and in FIG. 7, an abscissa shows ratio (x/L, y/L) of the set length (x, y) of the key connection to the length (L) of the bearing pressure receiving zone and an ordinate shows a ratio ($\Delta P/\Delta Po$) of the load fluctuation $\Delta P$ when the bearing according to the present invention is used, to the load fluctuation $\Delta Po$ when the conventional bearing is used.

As seen from FIG. 7, the load fluctuation of the roll rapidly increases between 0.15 and 0.25 in both the ratios x/L and y/L, so that the rolling force fluctuation is noticeably decreased by setting x/L or y/L to be less than 0.2, that is setting the length of the key connection to be less than 0.2 times, preferably less than 0.15 times the length of the bearing pressure receiving zone.

Furthermore, in order that the key effectively acts as the key connection which prevents the rotation of the sleeve relative to the roll neck, it is necessary that the key can satisfactorily endure the shearing stress acting on the key upon rolling.

This shearing strength of the key is determined by the shearing area (breadth×length) of the key and the strength of the material. It has been found that if the length of the key is more than 0.05 in x/L with the same breadth, there is no problem in the normal use.

However, the role of the key used for an oil film bearing is not only to prevent a rotation of the sleeve relative to the roll upon rolling but also to endure the maximum torque until a safety device, such as an over load clutch provided at a driving spindle (considering a burning accident owing to oil film break between the sleeve and the bushing) starts and to prevent the burning accident due to sliding between the roll and the sleeve so as to protect the roll. For this purpose, in the presently used keys, the size has been determined with reference to a large number of accidents involving this point, and a ratio l/L of the total length l of the key to the length of the bearing pressure receiving zone has been determined to be about 0.3 at least.

Accordingly, when a key in which the length is shortened, is used, the key should have the same shearing strength as in the prior key but this problem has been solved by providing a plurality of key connections.

Concerning the oil film bearing to be used for the hot finishing rolling mill, an investigation was made with respect to the number of the key connections necessary for obtaining the shearing strength (l/L=0.3) of the conventional degree when the length l of the key is varied in l/L from 0.05 to 0.4 and the obtained results are shown in FIG. 8.

As seen from FIG. 9, when l/L is 0.1~0.2, the number of the shortened keys may be 2~3 and these keys are preferably arranged in the equal interval along the circumference at the ends of the fitting zone.

The oil film bearing according to the present invention is very simply applied to the prior rolling machine and it is merely necessary to newly manufacture only the sleeve and the keyway already provided in the tapered neck of the roll is filled with a metal and then a keyway is provided according to the present invention.

As mentioned above, the key connection of the sleeve relative to the tapered neck is provided in the range of less than 0.2 times the length of the bearing pressure receiving zone from the end of the fitting of the sleeve and the tapered neck, whereby the rolling force fluctuation due to the deformation of the keyway is not caused.

Accordingly, only a slight amount of the rolling force fluctuation (which is deemed due to the roll eccentricity caused from the production error which is naturally inevitable in the stage of production of the rolling roll), becomes a problem. Thus, it has been confirmed that the adverse influence due to the roll eccentricity is less than the prior oil film bearing and the deviation of the sheet thickness is considerably decreased by applying the oil film bearing (provided with the key connection at the above described position) to the finishing rolling mills.

In application of this oil film bearing it is necessary to use this bearing at the finishing rolling mill, at least at the final stand of the finishing rolling mills in tandem type hot strip mill or at a plurality of stands including the final stand, and at least at the first stand in tandem type cold strip mill or at a plurality of stands including the first stand in tandem type cold strip mill. Because, in the hot rolling, even if a high sheet thickness accuracy is obtained at the entrance side of the final stand, when the bearing in the final stand is the prior one, the influence of variation of the roll gap due to the deformation of the keyway occurs and the sheet thickness accuracy at the exit side is deteriorated. However, in the cold rolling, the variation of the roll gap in the later stand where the work hardening in material proceeds, does not substantially influence the sheet thickness accuracy.

A variety of experiments have been made with respect to the deviation of the sheet thickness when AGC of the BISRA system is applied to a hot rolling mill provided with the oil film bearing according to the present invention. Detailed explanation will be made with respect to the obtained results hereinafter.

(1) Relation of the rolling speed to the dead zone.

If the load variation due to the roll eccentricity is supplied to the AGC as it is, when the rolling speed is slow, an amount of the roll eccentricity is printed on a sheet to be rolled in an enlarged shape, while when the rolling speed becomes fast, the screw down apparatus is apt to cause hunching and when a certain value is exceeded, the operation of the AGC becomes quite infeasible. Therefore, in AGC, the dead zone is provided to obviate the above described drawback. The hunching limitation is shown in FIG. 9 in the relation of the rolling speed to the amount of the dead zone. At the zone at a lower side than each line shown in FIG. 9, the hunching occurs.

As seen from FIG. 9, heretofore the amount of the dead zone must be about 60 μm in order to obtain a broad range of the rolling speed, so that the sheet thickness accuracy which can be expected, is about 60 μm. Although the sheet thickness accuracy may be improved by making the amount of the dead zone narrow, the rolling speed is limited within a narrow range in this case, so that the practical application is difficult.

While, the present invention can narrow the amount of the dead zone to about 20 μm without limiting the rolling speed.

(2) Relation of motor driven AGC gain to the dead zone.

When the sheet thickness at the exit side is varied owing to the variation of the rolling load, as mentioned in FIG. 1, the correction amount ΔS of the roll gap is calculated so as to make the deviation of the sheet thickness at the exit side zero but if this value is supplied to the reduction mechanism as it is (in this case, gain G=1.0), the control is too sensitive and the hunching is liable to be caused. Therefore, the gain is generally optimum to be about 0.5~0.7 considering the responsibility of the screw down system.

FIG. 9 is the case where the gain is 0.6 and the hunching limitation in this case at the highest rolling speed is shown in FIG. 10 in a relation of the motor driven AGC gain to the dead zone.

As seen from FIG. 10, when the oil film bearing according to the present invention is used, if the gain G is about 0.5~0.7 even at the highest rolling speed, the amount of the dead zone can be decreased to about 20 μm and if the amount of the dead zone is about 30 μm, the gain G can be increased to 0.9~1.0.

(3) The sheet thickness accuracy according to the present invention.

The variation of the sheet thickness at the exit side of the final stage of a stand when the oil film bearing according to the present invention is used for the final stage of a stand (N stand) and N−1 stand of the finishing rolling mills of the hot strip mill, the amount of the dead zone is 20 μm and AGC gain is 0.7. This is compared with the results obtained when the conventional oil film bearing is used, the amount of the dead zone is 60 μm and AGC gain is 0.5. The obtained results are shown in FIG. 11, (a) and (b) respectively. In FIG. 11, the wave of the sheet thickness for 12 seconds is the variation of the sheet thickness due to the skid mark.

When both data are compared, it can be seen that the deviation of the sheet thickness is remarkably decreased from 60 μm to 20 μm and the fine waves due to the roll eccentricity of each stand are decreased.

Then, the oil film bearing according to the present invention was provided at at least the final stand of the finishing rolling mills in the tandem system hot strip mill and the sheet thickness accuracy at the exit side of the final stand was measured with respect to each of the cases where the amount of the dead zone and AGC gain were adjusted or not adjusted as shown in Table 1. The obtained results are shown in FIG. 12.

For comparison, the same investigation as described above was made with respect to the case where the oil film bearing according to the present invention was used only in N−1 stand and the case where the conventional oil film bearing was used in all stands and the obtained results are shown in FIG. 12.

TABLE 1

|  | Amount of dead zone (μm) | AGC gain |
|---|---|---|
| Adjusted | 20 | 0.7 |
| Not adjusted | 60 | 0.5 |

When the oil film bearing according to the present invention is applied to at least the final stand and the dead zone and AGC gain are appropriately adjusted, the sheet thickness accuracy is remarkably improved and particularly, when the bearings are applied to the later three stands, the deviation of the sheet thickness is about 15 μm and is decreased to ¼ of the case of the conventional bearing.

In the above described case, the roll gap control in AGC is effected by motor driving and in this case, the optimum gain is about 0.7 but in the case of the hydraulic AGC, the optimum gain is about 0.85. In any case, the high sheet thickness accuracy can be obtained by making the amount of the dead zone to be less than 20 μm.

As mentioned above, according to the present invention, the deviation of the sheet thickness owing to the printing on the material to be rolled can be decreased with decrease of the roll eccentricity of the rolling roll and the sheet thickness accuracy can be largely improved by using this bearing together with AGC.

Furthermore, in the present invention, the deviation of the sheet thickness of the skid mark portion can be advantageously decreased owing to the improvement of the AGC performance, so that the rolling material can be taken out at a low temperature from a heating furnace and in the present invention, saving energy can be expected.

What is claimed is:

1. A method for rolling metal sheets having a low deviation of sheet thickness, which comprises rolling a metal sheet through a finishing rolling mill in which at least a final stand is provided with oil film bearings of a rolling roll, each of said bearings comprises a bushing in a roll chock bearing box, and a sleeve tightly fitted to a tapered neck of the roll to form a journal relative to the bushing, and is provided with a key connection fixing the sleeve to the rolling roll, which is formed by fitting a key in a keyway, said key and keyway having a substantially equivalent length of less than 0.2 times the length of a bearing pressure receiving zone.

2. The method as claimed in claim 1, wherein said method uses AGC in which variation of rolling load in the stand is measured and a roll gap is adjusted depending upon the degree of the variation to control the sheet thickness.

3. The method as claimed in claim 2, wherein a dead zone in AGC is less than 20 μm.

4. The method as claimed in claim 1 or 2, wherein the finishing rolling mill is a reverse type plate mill.

5. The method as claimed in claim 1 or 2, wherein the finishing rolling mill is a hot strip mill.

6. A method for rolling metal sheets having a low deviation of sheet thickness, which comprises rolling a metal sheet through a cold rolling mill in which at least a first stand is provided with oil film bearings of a rolling roll, each of said bearings comprises a bushing in a roll chock bearing box and a sleeve tightly fitted to a tapered neck of the roll to form a journal relative to the bushing, and is provided with a key connection fixing the sleeve to the rolling roll, which is formed by fitting a key in a keyway, said key and keyway having a substantially equivalent length of less than 0.2 times the length of a bearing pressure receiving zone.

7. In an oil film bearing for a rolling roll comprising a bushing in a roll chock bearing box, a sleeve tightly fitted to a tapered neck of the roll to form a journal relative to the bushing, and a key fitted in keyways formed in the tapered neck of the roll and in the sleeve, respectively, the improvement which comprises said keyway formed in the sleeve has a length substantially equivalent to that of a key which is less than 0.2 times that of a bearing pressure receiving zone, and is formed at a location in the sleeve corresponding to the keyway formed in the tapered neck of the roll, and the keyway in the tapered neck of the roll is formed at a location adjacent one of the ends of the tapered neck of the roll.

8. The bearing as claimed in claim 7, wherein the keyway in the tapered neck of the roll is formed at a location starting from the smallest diameter end of the tapered neck of the roll.

9. The bearing as claimed in claim 7, wherein the keyway in the tapered neck of the roll is formed at a location corresponding to the largest inner diameter end of the sleeve.

* * * * *